C. DOBBS.
POWDER CUTTING MACHINE.
APPLICATION FILED OCT. 20, 1908.

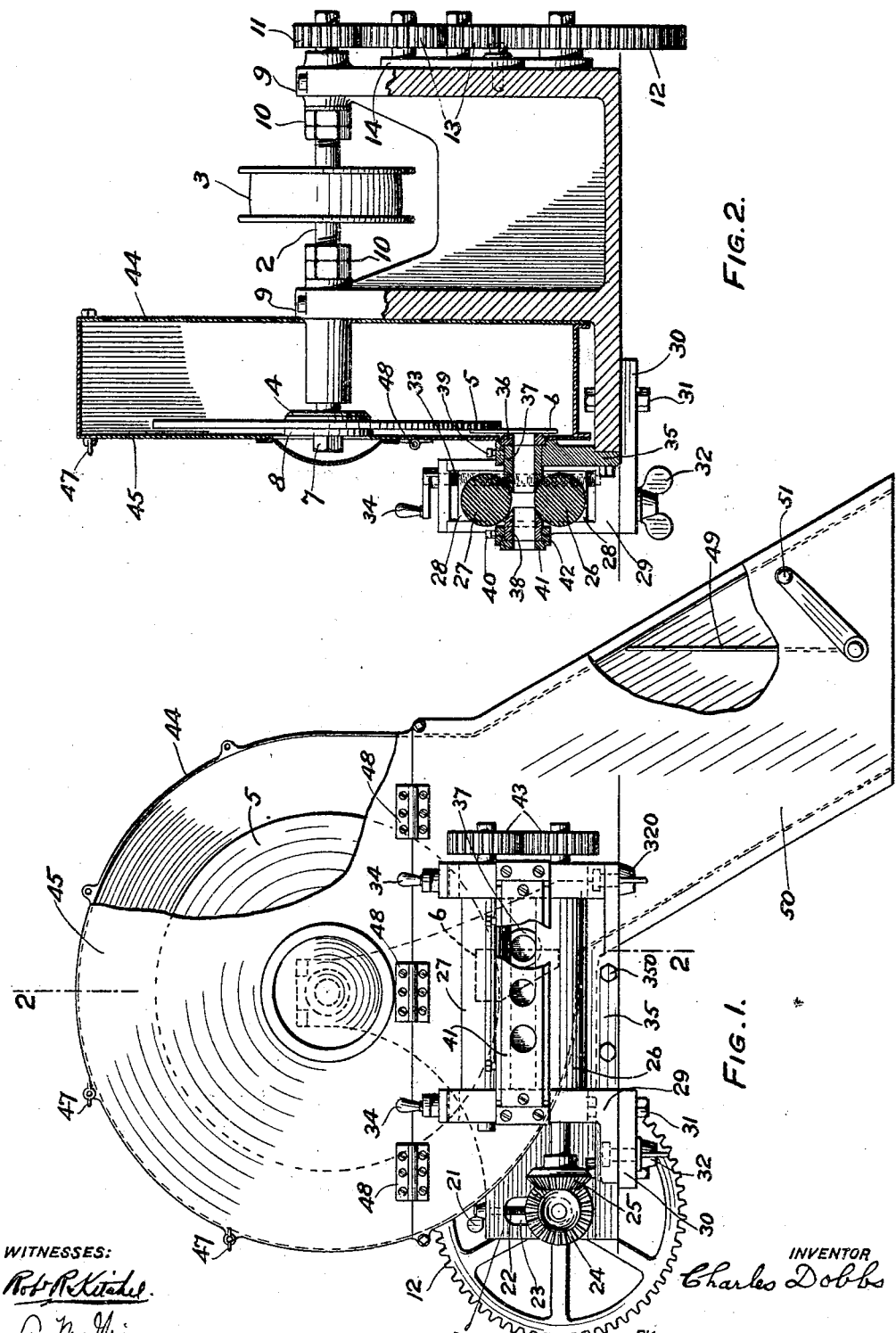

939,895.

Patented Nov. 9, 1909.
2 SHEETS—SHEET 2.

WITNESSES:
Robt R Kitchel
A. M. Urian

INVENTOR
Charles Dobbs
BY Harding & Harding
ATTORNEYS.

UNITED STATES PATENT OFFICE.

CHARLES DOBBS, OF HASKELL, NEW JERSEY, ASSIGNOR TO LAFLIN AND RAND POWDER COMPANY, OF NEW YORK, N. Y., A CORPORATION OF NEW YORK.

POWDER-CUTTING MACHINE.

939,895.  Specification of Letters Patent.  Patented Nov. 9, 1909.

Application filed October 20, 1908. Serial No. 458,735.

*To all whom it may concern:*

Be it known that I, CHARLES DOBBS, a citizen of the United States, residing at Haskell, county of Passaic, and State of New Jersey, have invented a new and useful Improvement in Powder-Cutting Machines, of which the following is a full, clear, and exact description, reference being had to the accompanying drawings, which form a part of this specification.

My invention relates to machines for cutting rods or cords of smokeless powder into grains, and its main object is to enable rods of different diameters to be cut into any lengths desired.

Figure 5:
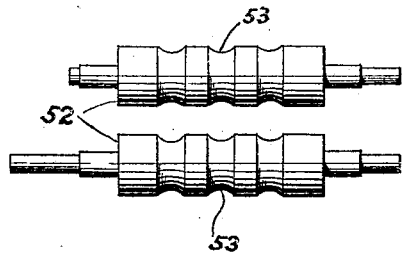
Figure 3:
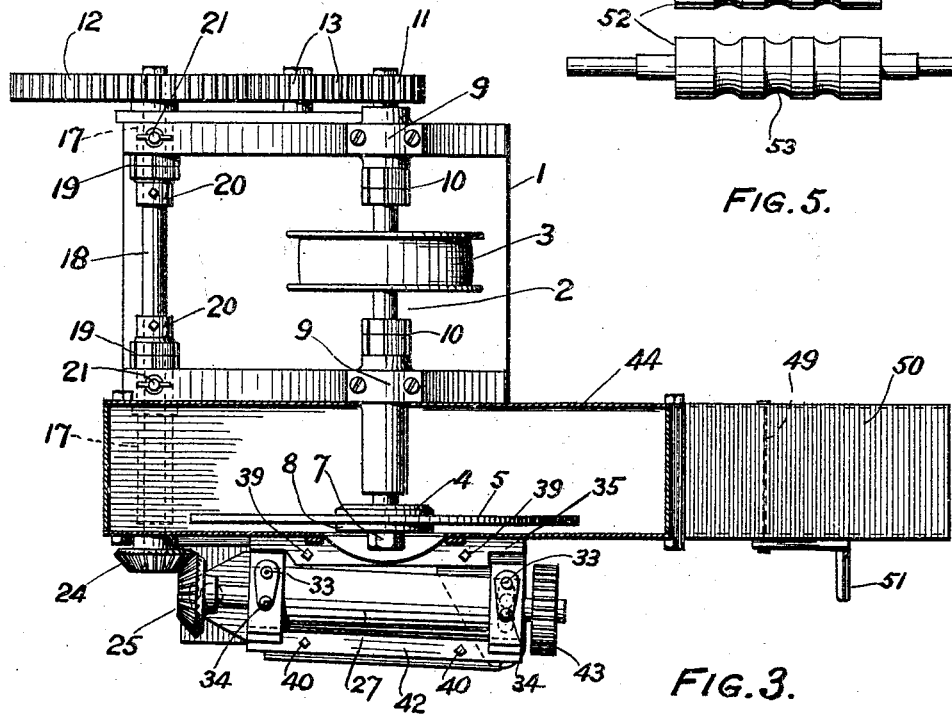
Figure 4:
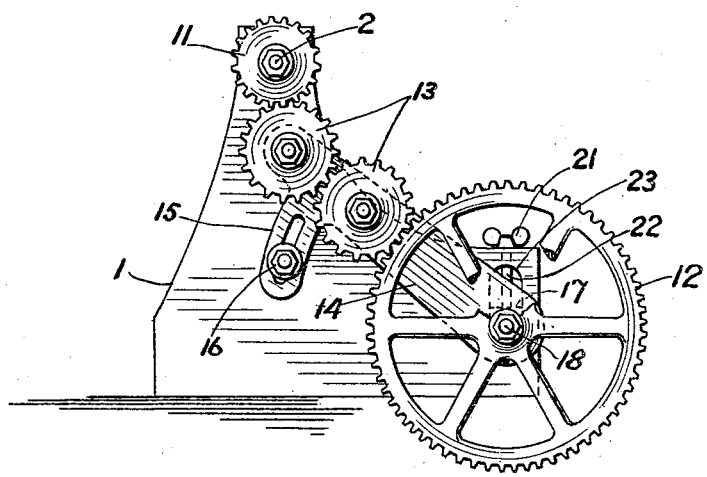

In the drawings, which represent a specific embodiment of my invention, Figure 1 is a front view of the machine. Fig. 2 is a section on the line 2—2 of Fig. 1. Fig. 3 is a plan view of the machine. Fig. 4 is a side elevation of the driving connections between the main driving shaft and the transmission shaft. Fig. 5 is a side view of the rolls detached from their bearings.

1 is the main frame of the machine.

2 is the main driving shaft.

3 is the driving pulley secured to the driving shaft.

4 is a flange near the end of the main shaft against the outer face of which the disk 5, carrying the cutting knife or knives 6, is secured.

7 is a nut and 8 a washer by means of which the disk 5 is confined against the flange 4.

9, 9, are caps for holding the main driving shaft 2 in its bearings on the main frame.

10, 10, are lock nuts threaded on the main driving shaft and working against the shaft bearings and by means of which the shaft may be adjusted longitudinally to give the cutter-knife or knives 6 any desired friction against the cutting die (hereinafter described), and by means of which also the main shaft may be thrown clear from the cutting plate in order to make a quick change of knives.

11 is the main driving or change gear secured to the main driving shaft.

12 is the transmission gear for the powder feed rolls (hereinafter described).

13, 13, are intermediate gears between the driving or change gear and the transmission gear. The intermediate gears turn in bearings in the stud plate 14 pivoted on the transmission shaft and provided with a slotted arm 15 which is engaged by a set nut 16 on the main frame. By this construction, the proper driving connections may be maintained between a change gear 11 of any size and the transmission gear 12.

17, 17, are sleeves or bearings for the transmission shaft 18 to which the transmission gear 12 is secured.

19, 19, are lock nuts threaded on the transmission shaft 18 for holding the sleeves or bearings 17 in position.

20, 20, are collars on the transmission shaft for holding it in position longitudinally.

21, 21, are wing nuts threaded on the bolts 22, 22, attached to the sleeves or bearings 17. By means of these nuts, the transmission shaft 18 may be raised or lowered in the slots 23, 23, in the main frame.

24, 25, are miter gears respectively on the transmission shaft 18 and on the shaft of the lower powder feed roll 26. The knurled feed rolls 26, 27, rotate in bearings 28, 28, movable vertically in guides on the housing 29.

30 is a holding plate bolted to the main casting by means of bolts 31.

32 is a wing nut and bolt extending through the holding plate and on which the housing 29 is swiveled, permitting the latter and the feed rolls 26, 27, carried thereby to be swung toward and from the cutting disk and knives.

32 is a wing nut and bolt by means of which the housing 29 is held at any angle desired.

By making the roll housing adjustable so that it may be swung out at an angle to the cutting disk, a straight cut may be obtained on the larger sizes of powder. With the rolls fixed parallel to the cutting disk or plane of rotation of the knives, the large size powders fail to cut perfectly straight.

33 are right and left screw threaded rods, the two threads engaging respectively the bearings for the two feed rolls.

34 are handles secured to the rods 33 respectively, by means of which the rods 33 are turned to regulate the distance between the feed rolls.

35 is a holder bolted to the main frame by means of the tap screws 350.

36 is a powder cutting die screwed to the back of the holder 35.

37 is a back powder web secured to the holder 35 by the set screws 39.

42 is a holder secured to the housing 29.

38 is the front powder web secured to the holder 42 by set screws 40.

41, 41, is the feed die secured to the holder 42.

The upper feed roll 27 is driven from the lower feed roll 26 by means of intermeshing spur gears 43, 43, on the shafts of the two rolls. These gears are readily removable so as to be replaced by smaller or larger gears dependent upon the extent of the adjustment of the feed rolls toward or from each other.

44 is a hood inclosing the disk 5 to which the cutting knife or knives 6 are secured. This hood also acts as a conductor to receptacles for powder. The front plate 45 of the hood is fastened by means of the wing nuts 47 and is adapted to swing outwardly on the hinges 48 to allow access to the interior of the hood.

49 is a deflecting damper pivoted in the chute portion 50 of the hood on a horizontal axis extending through the hood.

51 is a handle secured to the pivot of the damper.

The damper may be swung so that its free end contacts with either side of the hood, thereby enabling the powder to be fed to either of two receptacles, thereby facilitating the separation of good from defective powder.

In Fig. 5 there is shown a modified form of feed rollers 52, 52, the same being provided with complementary annular grooves 53, 53, curved correspondingly to the curvature of the powder webs.

In operation, the feed rolls 26, 27, feed the powder rods through the feed die 41, powder webs 38, 37, and cutting die 36, the ends of the rods being cut off by the revolving cutter 5—6.

The machine may be readily adapted for the cutting of powder rods of different diameters by the following changes and adjustments: replacing the feed die 41, cutter die 36 and powder webs 37, 38, by parts corresponding to the size of rod upon which it is desired to operate; turning the threaded rods 33 to bring the feed rolls the proper distance apart; operating the wing nuts 21 to raise or lower the transmission shaft 18; raising or lowering the stud plate 14 to maintain driving connections between the driving gear 11 and transmission gear 12; and swinging the roll housing 29 to vary the angle of inclination of the rolls to the plane of rotation of the cutting knives. The relation between the speed of the cutter and the feed of the powder is constant with a given adjustment, thus insuring equality in the length of the rod-sections severed by the cutter. This relation may be varied as desired by replacing the driving gear 11 with another gear of larger or smaller size and then adjusting the stud plate 14 to maintain the driving connections.

Having now fully described my invention, what I claim and desire to protect by Letters Patent is:—

1. In a powder cutting machine, the combination with a driving shaft and a cutter operated thereby, of feed rolls, positively actuated means to adjust said rolls toward or from each other to maintain them at a fixed distance apart, power transmitting mechanism between the driving shaft and both feed rolls, and adjusting means engaging said power transmitting mechanism and adapted to be operated to maintain the driving connection between the driving shaft and the feed rolls notwithstanding the adjustment of the latter.

2. In a powder cutting machine, the combination with a driving shaft and a cutter operated thereby, of a transmission shaft, feed rolls, driving connections between the driving shaft and transmission shaft, driving connections between the transmission shaft and both feed rolls, positively actuated means to adjust the feed rolls toward or from each other, to maintain them at a fixed distance apart, and means to adjust the transmission shaft to maintain its driving connection with the feed rolls in any of their adjusted positions.

3. In a powder cutting machine, the combination with a driving shaft and a cutter operated thereby, of a transmission shaft, feed rolls, driving connections between the driving shaft and transmission shaft, driving connections between the transmission shaft and both feed rolls, means to adjust the feed rolls to vary the distance between their axes and hold them fixed in their adjusted relations, means to adjust the transmission shaft to maintain its driving connection with the feed rolls in different adjusted positions of the latter, and means to adjust the driving connections between the driving shaft and the transmission shaft.

4. In a powder cutting machine, the combination with a driving shaft and a cutter operated thereby, of a transmission shaft, feed rolls, driving connections between the driving shaft and transmission shaft, driving connections between the transmission shaft and one of the feed rolls, driving connections between such feed roll and the other feed roll, means to positively vary and define the distance between the feed rolls, and means to adjust the transmission shaft to maintain its driving connection with the first named feed roll.

5. In a powder cutting machine, the combination with a cutter, of a pair of feed rolls, means for operating the cutter and rolls in unison, a housing supporting the rolls, said housing being pivoted on a vertical axis to permit said rolls to swing outwardly at an angle to the cutter.

6. In a powder cutting machine, the combination with a pair of feed rolls, of a cutter, means for operating the rolls and cutter in unison, and a hood for the cutter, said hood comprising an upper portion inclosing the cutter and a lower portion containing a discharge mouth, the upper portion including a front plate hinged at its lower edge to the lower portion and detachably secured to the remainder of the upper portion.

7. In a powder cutting machine, the combination with a pair of feed rolls, of a cutter, means for operating the rolls and cutter in unison, and a hood for the cutter, comprising a part inclosing the cutter and a discharge chute, and a wing or damper in the discharge chute for diverting the grains.

8. In a powder cutting machine, the combination with the frame, a driving shaft turning in bearings on the frame, a rotary cutter operated by said shaft, and a cutter die through which the powder is adapted to be fed into line with the cutter, of locknuts threaded on the driving shaft and engaging the frame at two different points and by means of which said shaft may be adjusted longitudinally to give the cutter the desired friction against the cutting die and facilitate changing of knives.

9. In a powder cutting machine, the combination with the driving shaft, of a transmission shaft, driving connections between the driving shaft and the transmission shaft, feed rolls, driving connections between the transmission shaft and feed rolls, vertically movable sleeves or bearings in which the transmission shaft rotates, means to adjust said sleeves vertically, lock-nuts threaded on the transmission shaft to maintain said sleeves in position, and collars on the transmission shaft to hold the same from longitudinal movement.

10. In a powder cutting machine, the combination with a cutter, of a feed die, a front web, a pair of feed rolls, a back web, and a cutting die, through all of which the powder travels on its way to the cutter, a roll housing, upper and lower feed roll bearings vertically movable in guides on the housing, and means for adjusting the feed roll bearings from or toward each other.

11. In a powder cutting machine, the combination with the frame, of a cutter, a pair of feed rolls adapted to feed powder to the cutter, a roll housing, a vertically extending wing nut and bolt on the frame and on which the roll housing is pivoted, and a second wing nut and bolt on the frame engaging the free end of the housing and adapted to hold the same in the position to which it is swung on its pivot.

12. In a powder cutting machine, the combination with the main frame, of a cutter, a holder secured to the main frame, a cutter die and a back web through which the powder rods pass to the cutter, said cutter die and back web being secured to said holder, a supporting plate secured to the frame, a housing swiveled on said supporting plate, a front web and feed die carried by the housing, upper and lower feed roll bearings movable vertically in guides in the housing, a right and left hand threaded rod engaging said upper and lower roll bearings, and means to turn said rod to move said roll bearings toward or from each other.

13. In a powder machine, the combination with a cutter, of a pair of feed rolls, and driving mechanism adapted to actuate the rolls and cutter in unison, means permitting the rolls to swing outwardly at an angle to the cutter, and means to hold the rolls at the angle to which they are swung.

14. In a powder machine, the combination with the driving shaft, of a cutter actuated thereby, a transmission shaft, driving connections between said shafts, feed rolls, driving connections between the transmission shaft and the feed rolls, means to vary the distance between the feed rolls, adjusting means to maintain the transmission shaft in driving connection with the feed rolls notwithstanding adjustment of the latter, and adjusting means to maintain the transmission shaft in driving connection with the driving shaft notwithstanding adjustment of the transmission shaft.

In testimony of which invention, I have hereunto set my hand, at Haskell, N. J., on this 14 day of October, 1908.

CHARLES DOBBS.

Witnesses:
 MARIE C. COMAR,
 WILLARD SWEETMAN.